A. J. CUNNINGHAM.
LID HOLDER.
APPLICATION FILED OCT. 24, 1919.

1,390,766.

Patented Sept. 13, 1921.

Inventor
A. J. Cunningham

By Geo. P. Kimmel.
Attorney

UNITED STATES PATENT OFFICE.

ALBINA J. CUNNINGHAM, OF BRIDGEWATER, MASSACHUSETTS.

LID-HOLDER.

1,390,766.  Specification of Letters Patent.  Patented Sept. 13, 1921.

Application filed October 24, 1919. Serial No. 332,895.

*To all whom it may concern:*

Be it known that I, ALBINA J. CUNNINGHAM, a citizen of the United States, residing at Bridgewater, in the county of Plymouth and State of Massachusetts, have invented certain new and useful Improvements in Lid-Holders, of which the following is a specification.

This invention relates broadly to lid holders and more particularly to that type of lid holders adapted to be removably carried by a receptacle to receive the lid thereof when desired.

The primary object of the invention is to provide a lid holder which may be placed on a cooking or serving receptacle or dish when it is desired to remove but retain the top or cover near the receptacle.

Another object of the invention is to provide a lid holder which will prevent dripping of substance upon a stove or table cloth upon removal of the cover from the recaptacle and the placing of it in the lid holder.

A further object of the invention is to provide a lid holder formed of two pieces so that it may be very readily manufactured at very small initial cost.

Other objects of this invention not at this time more particularly enumerated will be clearly understood from the detailed description and drawings forming a part of this specification.

Furthermore this invention consists in the novel arrangement and combination of parts more particularly described in the following specification and embodied in the claims appended hereunto and forming part of this application.

Referring to the drawings.

In the drawings wherein like characters of reference indicate like or similar parts through the several views, the letter A designates a receptacle of any desired type, having a cover B. The type of receptacle and cover does not form any part of the substance of my invention.

Figure 1:
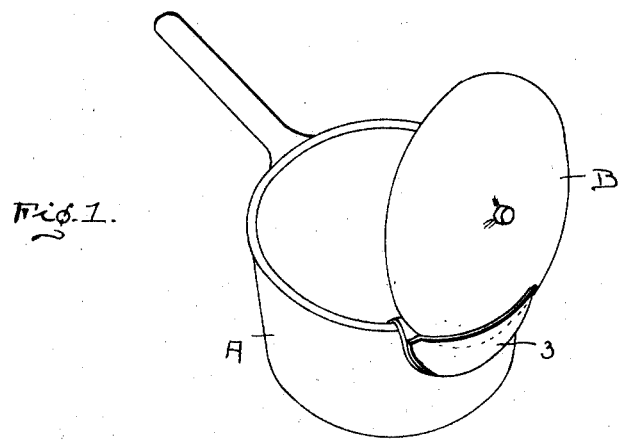
Figure 1 is a perspective view of a receptacle and cover with my invention operating in connection therewith.
Figure 2:
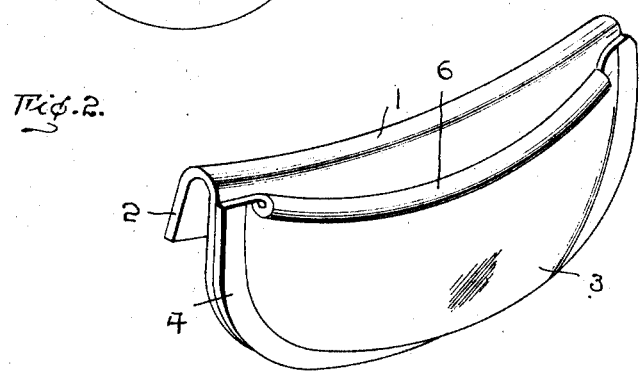
Fig. 2 is a perspective front view of my invention.
Figure 3:
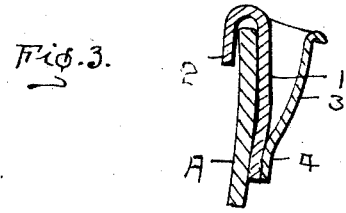
Fig. 3 is a fragmentary sectional elevation.
Figure 5:
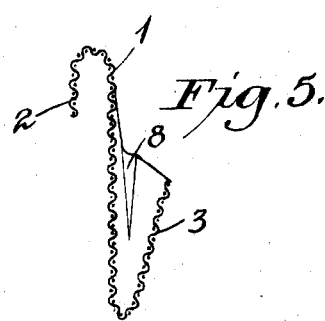
Fig. 5 is a transverse section taken through Fig. 4 on the line 5—5 thereof.

Referring particularly to Figs. 1, 2 and 3, illustrating the preferred embodiment of the present invention, a lid receiving pocket 60 is shown the numeral 1 indicating the body portion or inner wall which is preferably arcuate in form and curved slightly longitudinally to conform to the configuration of the conventional type of receptacle. An extension 2 formed on the upper edge of the body 1 is bent over and upon the body 1 in slightly spaced relationship and substantially parallel thereto in order to form a hook-like lip for engagement over the upper edge of the receptacle. The outer wall 3 of the pocket is formed of one piece of metal and has a curvature more acute than the body 1 in order to conform to the configuration of the cover of the conventional type of receptacle and is secured around its edges as at 4 to the body 1. The method of securing the pocket wall 3 to the body 1 does not form a part of my invention and I desire it to be understood that it may be either welded, soldered or otherwise secured thereto which ever is found the most desirable in practice.

It has been found desirable to form a bead 6 around the upper edge of the pocket in order to eliminate any possibility of a sharp edge which might injure the hand of the user or mar the cover.

Figure 4:
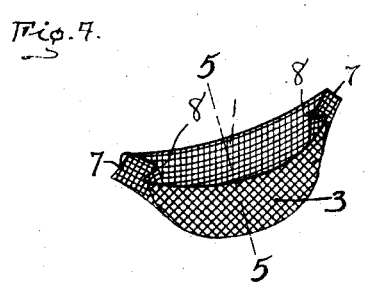
Fig. 4 is a modification thereof.

In the modification illustrated in Fig. 4 the entire device is composed of a screen wire and is preferably woven in one piece and has slightly extended doubled portions 7 for abutting against the receptacle and reinforcing the pocket. With the exception of the type of material used and the extensions 7 the actual construction of the modification in no way differs from the principal embodiment before described.

Referring particularly to Fig. 4 attention is called to the fact that indentation 8 may be formed in the side to contact with that portion of the cover nearest its edge which is least curved. The advantage of this will be recognized when it is pointed out that covers are usually formed to approximate a broken curve in cross section.

Manifestly, all that is necessary in the operation of this device is to place the lip 2 over the edge of the receptacle A and place the cover B in the pocket designed therefor.

While I have shown and described the preferred embodiment of my invention it will be understood that minor changes in construction, combination and arrangement of parts may be made without departing from the spirit and scope of the invention as claimed.

What I claim is:

1. A detachable lid support for vessels comprising a pocket shaped to receive a lid and curved longitudinally to conform to the side of the vessel to which it is to be applied and having an inturned hook-like member on the upper edge of its inner wall to engage the edge of the vessel, the outer wall of said pocket being lower than the inner wall and more abruptly curved to space it laterally from said inner wall to form a pocket substantially V-shaped in cross section, the outer wall being slightly curved transversely.

2. The combination with a receptacle having a removable cover, of a one piece removable holder for the cover, comprising an arcuate body portion, a depending lip formed by a bend in the body portion, an extension formed on the body portion for reinforcing the lip and a cover receiving pocket formed on the body portion and curved slightly to conform to the configuration of a cover.

In testimony whereof, I affix my signature hereto.

ALBINA J. CUNNINGHAM.